(12) United States Patent
Scheer

(10) Patent No.: US 6,252,724 B1
(45) Date of Patent: Jun. 26, 2001

(54) METHOD FOR PRODUCING A FRESNEL LENS ON A CATADIOPTRIC BASIS, AND A FRESNEL LENS PRODUCED USING THIS METHOD

(75) Inventor: Ulla Scheer, Wannweil (DE)

(73) Assignee: aqua signal Aktiengesellschaft Spezialleuchfabrik (DE)

( * ) Notice: Subject to any disclaimer, the term of this patent is extended or adjusted under 35 U.S.C. 154(b) by 0 days.

(21) Appl. No.: 09/357,472

(22) Filed: Jul. 20, 1999

(30) Foreign Application Priority Data

Jul. 31, 1998 (DE) ............................................. 198 34 521

(51) Int. Cl.$^7$ ........................................................ G02B 3/00
(52) U.S. Cl. ........................ 359/723; 359/742; 362/338; 428/195
(58) Field of Search ..................... 359/742, 743; 362/338, 334, 337; 428/195; 264/1.32

(56) References Cited

U.S. PATENT DOCUMENTS

| | | | |
|---|---|---|---|
| 4,178,066 | * 12/1979 | Di Vita | 350/96.18 |
| 5,404,869 | 4/1995 | Parkyn . | |
| 5,613,769 | 3/1997 | Parkyn, Jr. et al. | 362/338 |
| 5,815,327 | * 9/1998 | Wong | 359/742 |
| 6,107,000 | * 8/2000 | Lee et al. | 430/296 |

FOREIGN PATENT DOCUMENTS

| | | |
|---|---|---|
| 603 666 | 10/1934 | (DE) . |
| 1 233 792 | 2/1967 | (DE) . |
| 2 240 966 | 2/1973 | (DE) ............................. G02B/27/02 |
| 33 17 519 A1 | 11/1984 | (DE) ................................ F21V/5/04 |

OTHER PUBLICATIONS

Eichler, H. J. et al. "Bergmann–Schaefer, Lehrbuch der Experimentalphysik, Band III Optik, 6. Auflage", 1974, De Gruyter, Berlin XP002151626 Kapitel I, 14.

Rossi, M. et al. "Refractive And Diffractive Properties Of Planar Micro–Optical Elements", Applied Optics US, Optical Society of America, Washington DC, Bd. 34, Nr. 26, Sept. 10, 1995, XP000523025.

Erismann, F., "Design Of A Plastic Aspheric Fresnel Lens With A Spherical Shape", Optical Engineering, US, Society of Photo–Optical Instrumentation Engineers, Bellingham, Bd. 36, Nr. 4, Apr. 1, 1997, XP000700904.

Vanderwerf, D., "Approximating The Fresnel Lens", Electro–Optical Systems Design, Bd. 14, Nr. 2, 1982, XP002151625.

* cited by examiner

Primary Examiner—Georgia Epps
Assistant Examiner—Tim Thompson
(74) Attorney, Agent, or Firm—Technoprop Colton LLC

(57) ABSTRACT

The invention relates to a method for producing a Fresnel lens having a staged entrance surface, reflecting surfaces and an exit surface. The entrance surface is subdivided into outer concentric stages and a central part. The central part is aspherically curved on an entrance side and plane on an exit side by satisfying the eikonal condition. Every stage has a top side, underside and outer side, top sides and undersides being of plane design, and the outer sides having curvatures appropriate for satisfying the eikonal condition.

13 Claims, 5 Drawing Sheets

METHOD FOR PRODUCING A FRESNEL LENS ON A CATADIOPTRIC BASIS, AND A FRESNEL LENS PRODUCED USING THIS METHOD

BACKGROUND OF THE INVENTION

1. Technical Field

The invention relates to a method for producing a Fresnel lens on a catadioptric basis having a staged entrance surface, reflecting surfaces and an at least partially curved exit surface. The invention also relates to a Fresnel lens.

2. Prior Art

U.S. Pat. No. 5,404,869 discloses a Fresnel lens by means of which the light beams from a punctiform light source are rendered parallel by suitable beam guidance. The particular advantage of the lens consists in the low overall height, the large diameter and the short distance between the lens and light source. This is rendered possible by a staged design of the Fresnel lens. In a central region, the lens has a curved entrance surface and a likewise curved exit surface, compare FIG. 23 of the document. Concentric stages, for example 11 stages, are arranged outside the middle region. Each stage can be regarded as a prismatic element (or annular prism) and has an entrance surface (top side), a reflecting surface (underside) and an exit surface. The top side and underside are plane in each case, while the exit surface is curved in each case.

The light beams must be guided exactly in order to achieve an optimum light yield. In a corresponding manner, the geometry of the individual stages is to be calculated exactly. If the optimum shape of the individual stages and of the middle region are known, machine tools can be programmed to produce a corresponding Fresnel lens or a mould therefor. Because of the rotationally symmetrical construction of the Fresnel lens, the determination of the data of a radial cross section, specifically from the middle of the lens up to the outer edge (or vice versa), suffices for a unique description of the shape.

BRIEF SUMMARY OF THE INVENTION

In accordance with the method according to the invention, the shape of the Fresnel lens is determined as follows:

a) a radial cross section (14) is determined in a stagewise fashion, specifically firstly for an arbitrary first stage (stage 1), then for the stages adjacent thereto, and thereafter successively for all further adjacent stages until the cross sections of the individual stages have all been determined, b) starting from
predetermined angles $\alpha_{A_i}$ of top sides of the stages relative to a central axis (x-axis) of the lens,
the coordinates $(x_{A_1}, Y_{A_1})$ of a corner point $A_1$ of the first stage referred to the location (0,0) of a punctiform light source (11),
the angular ranges in which the individual stages (i) receive light,
a coordinate $flx_1$ of an outermost point $(flx_1, fly_1)$ of the section of the exit surface (13) which belongs to the first stage (i=1),
and an angle $\delta_1$ of a reflecting surface of the first stage, c) firstly the coordinates $fly_1$ of the outermost point $(flx_1, fly_1)$, the eikonal and the further coordinates $(flx_1, fly_1)$ of the exit surface (13) are determined for the first stage, specifically for a number of light beams corresponding to the desired accuracy, d) on the basis of the data determined for the first stage, the data of a second stage, then of a third stage, etc. are determined for all the stages as a whole, e) finally, for a middle region (middle part 15) of the lens (10) having no reflecting surfaces the data of a curved entrance surface (inner surface 28) are determined taking account of the eikonal condition and with the exit surface (13) prescribed, and f) the complete outer shape of the lens (10) is determined by rotation of the radial cross section (14) about a central axis (x-axis).

The mode of procedure described permits a rapid determination of the complete outer shape of the Fresnel lens for different initial data and different applications.

It is advantageous to employ the following boundary conditions as a basis:

the punctiform light source is at the zero point of an (xy) coordinate system, the middle part of the lens has an aspherical entrance surface and a plane exit surface, the top sides of all the stages run parallel to the x-direction, the corner point (point of intersection of the top side and underside) of the outermost stage ($1^{st}$ stage) lies on the y-axis, and every stage receives light from a 5° angular range.

Particularly advantageous is a mode of procedure in which an angle between the reflecting surface and entrance surface in each stage is selected such that a beam section iii of the outer edge beam a forms with the entrance surface in this region an angle which is as small as possible. Dark zones after the exit of the light from the lens are largely avoided in this way.

The variables $\delta$, $flx_1$, $fly_1$ act reciprocally for determining the data of the first stage. Either $\delta_1$ and $flx_1$, or else $flx_1$ and $fly_1$, are prescribed, and the respective other value is determined. If $\delta_1$ and $flx_1$ are prescribed, $fly_1$ is yielded by the intersection of the beam reflected at the reflecting surface as a section of the inner edge beam b of the first stage with the plane defined by $flx_1$. The term "inner" edge beam relates to the arrangement before the beams enter the lens. The edge beams closest to the central axis of the lens are denoted as inner edge beams, and the edge beams respectively closest to the circumference of the lens are denoted as outer edge beams. The edge beams cross one another inside the lens, with the result that the inner edge beam b of the first, outer stage on the exit side marks the outermost edge.

It is possible to proceed from estimated or empirical values when establishing the variables $flx_1$ and $fly_1$. In any case, $flx_1$ is to be substantially larger than the x-coordinate for the corner point of the first stage, and $fly_1$ is equally to be substantially larger than the y-coordinate of the corner point of the first stage. In this case, $flx_1$ largely establishes the thickness of the lens, while $fly_1$ relates to the diameter of the lens.

It is important for the eikonal condition to be satisfied inside every stage. That is to say, the sums of the optical path lengths of the beams correspond inside every stage. It is known that the optical path length of a light beam is yielded by the geometrical path length multiplied by the refractive index. Normally, the result is three different zones with different optical path lengths, specifically the entrance side (air), the lens material and exit side (air). The geometrical path length terminates at a reference plane which can be assumed to be somewhere behind the exit side of the lens, and which naturally runs perpendicular to the central axis of the lens or to the optical axis. The beam guidance is calculated in this case such that the individual light beams strike parallel to one another and perpendicular to the reference plane. Such a lens produces a maximum degree of light yield in conjunction with uniform distribution of the light. Expansion of the light beam or focusing of the latter is also conceivable. The reference plane must then be assumed to be a surface which is concave or convex, as seen from the light source.

A special feature is examination of t he data of the second stage after establishing the first stage. For this purpose, two iteration steps are conducted in a nested fashion. Firstly, an estimated value is assumed for the x-coordinate of the corner point $A_2$ of the second stage, specifically $x_{A_2}$. Since the angular ranges in which the stages receive light are known, as are the angles $\alpha_{A_i}$ of the top sides of the stages i, the y-coordinates of the corner point $A_2$, and thus the point ($x_{A_2}$, $y_{A_2}$) can be calculated. Hereafter, the angle $\delta_2$ of the reflecting surface of the second stage is determined iteratively until a beam section $y_{iii}$ for an inner edge beam b of the second stage lies on the point with the coordinates (flx$_2$, fly$_2$), (flx$_2$, fly$_2$) corresponding to the closest coordinates (flx$_1$, fly$_1$) of the first stage, to the edge beam a there. Finally, the angle between the inner edge beam b of the second stage and the outer edge beam a of the first stage is checked before exit from the lens and minimized by variation of $x_{A_2}$ and subsequent iteration of $\delta_2$. As soon as the angle $\delta_2$ of the reflecting surface of the second stage has been determined, all further coordinates (flx$_2$, fly$_2$) can be determined taking account of the eikonal condition (inside the second stage).

The lens according to the invention is produced using the method described above. The further production steps to be carried out after determination of the geometrical shape can differ. The material used for the lens is important in this regard. It is preferred to use pressed glass, polycarbonate or PMMA (acrylic). A mould for the lens can be produced on the basis of the shape determined for the latter. Thus, the data determined can drive an appropriate machine tool directly. Also conceivable is production as a turned part with the use of turning and polishing operations to be carried out taking account of the data determined. Thus, for example, the surfaces on the front and rear of the lens can be machined as far as an oversize of $$\frac{1}{100} \text{ millimeters}$$

or less, and one or more polishing operations can subsequently be carried out to achieve the final shape.

Further features of the invention follow from the patent claims and the remainder of the description.

BRIEF SUMMARY OF THE DRAWINGS

An exemplary embodiment is explained in more detail below with the aid of drawings, in which.

DETAILED DESCRIPTION OF THE PREFERRED EMBODIMENTS

The aim is to design a beam-guiding Fresnel lens 10 which collects the entire light of a point light source 11 from an open half space, and passes it on as parallel light. The lens 10 comprises an entrance surface 12, arranged in a staged fashion, and an aspherically curved exit surface 13. The calculations are based on the principles of geometrical optics, taking account of the eikonal condition (equal optical path lengths). An LED-ND diode (wavelength $\lambda$=632 nanometers) is assumed as light source. The design data required to fabricate the lens are determined on the basis of predetermined initial parameters.

A. Fundamental Shape of the Lens

Figure 1:
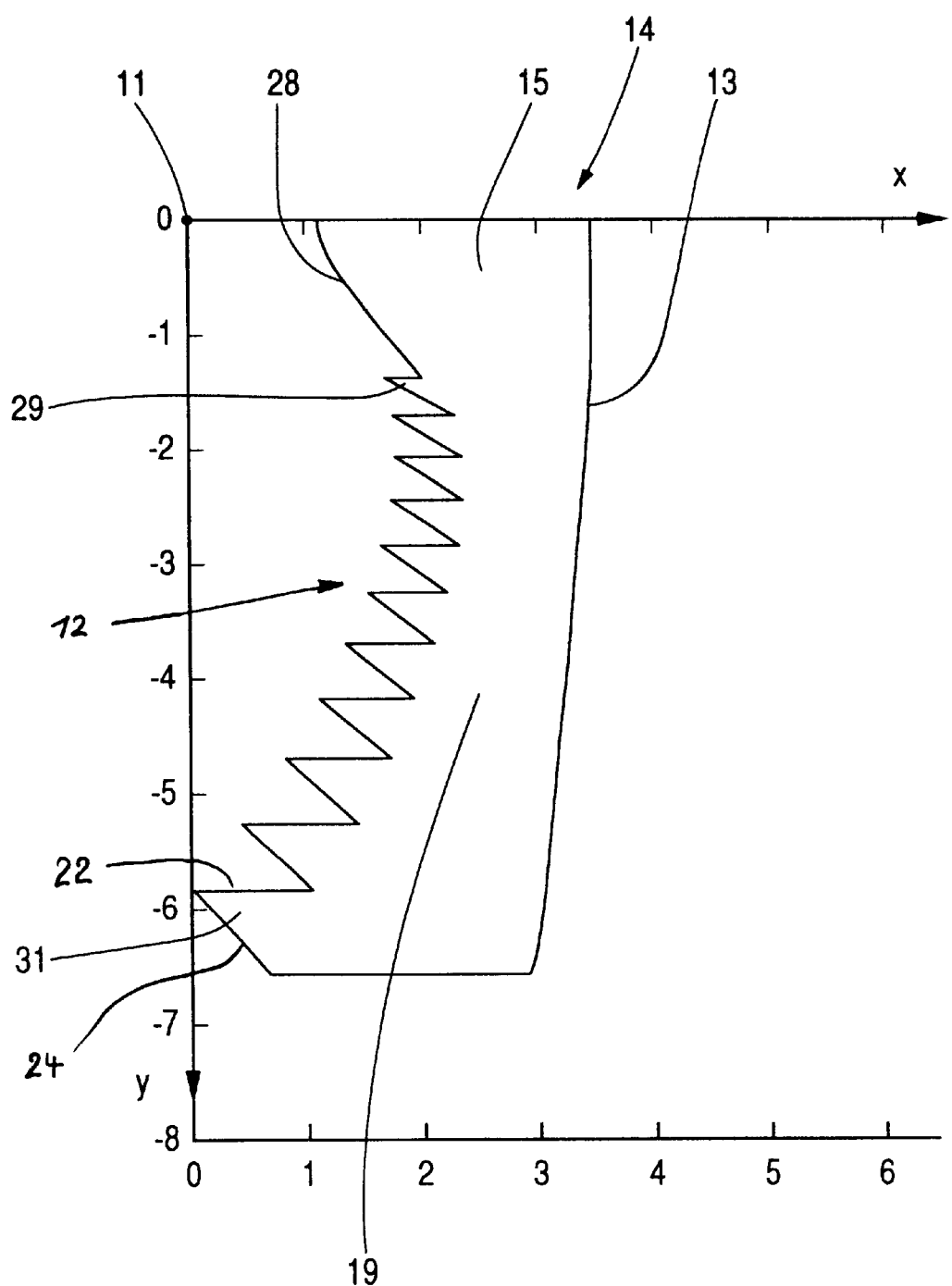
FIG. 1 shows a half cross section of a designed lens.

A half cross section 14 of the designed Fresnel lens 10 is represented in FIG. 1. For the purposes of calculation, the point light source 11 is assumed to be at the point (0,0) of an x, y-coordinate system. The side (entrance surface 12) of the lens 10 facing the light source 11 comprises an aspherical middle part 15 and eleven stages which increase outwardly in their dimension, the outermost stage being denoted as stage 1. The curvature of the outer side (exit surface 13) of the lens 10 is calculated using the eikonal theory in such a way that the exiting beams run parallel to the x-axis behind the lens 10. The x-axis is simultaneously the central axis of the lens 10 in this case.

Figure 2:
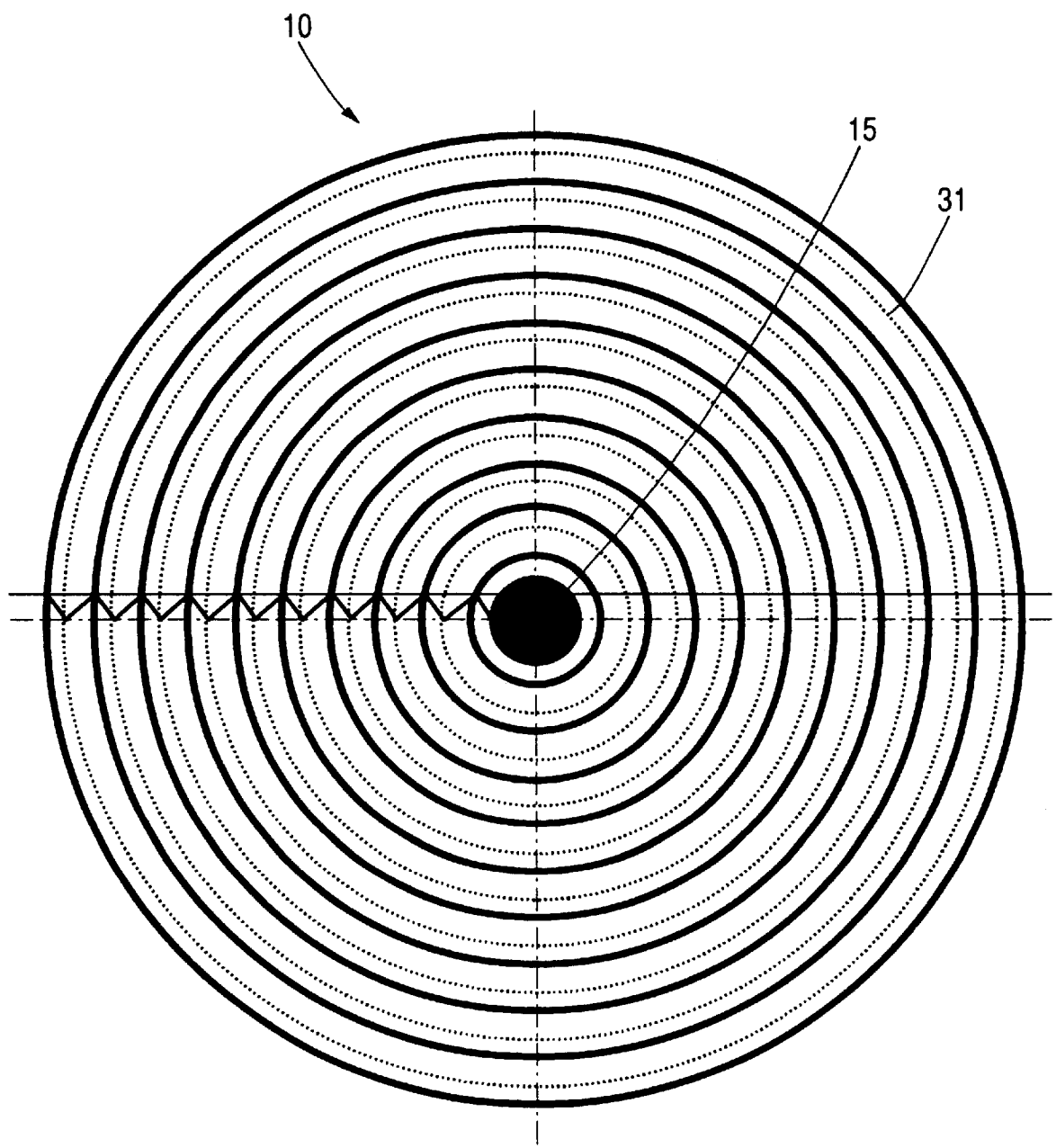
FIG. 2 shows the lens in top view.

The scale used in FIG. 1 is specified in arbitrary units, with the result that although the size relationships are shown the real dimensions of the lens 10 are not. These dimensions can be established by selecting the diameter of the lens 10. The complete three-dimensional configuration of the lens 10, as represented in top view in FIG. 2, is obtained by rotating the contour about the x-axis.

B. Course of the Beam in the Lens

Figure 3:
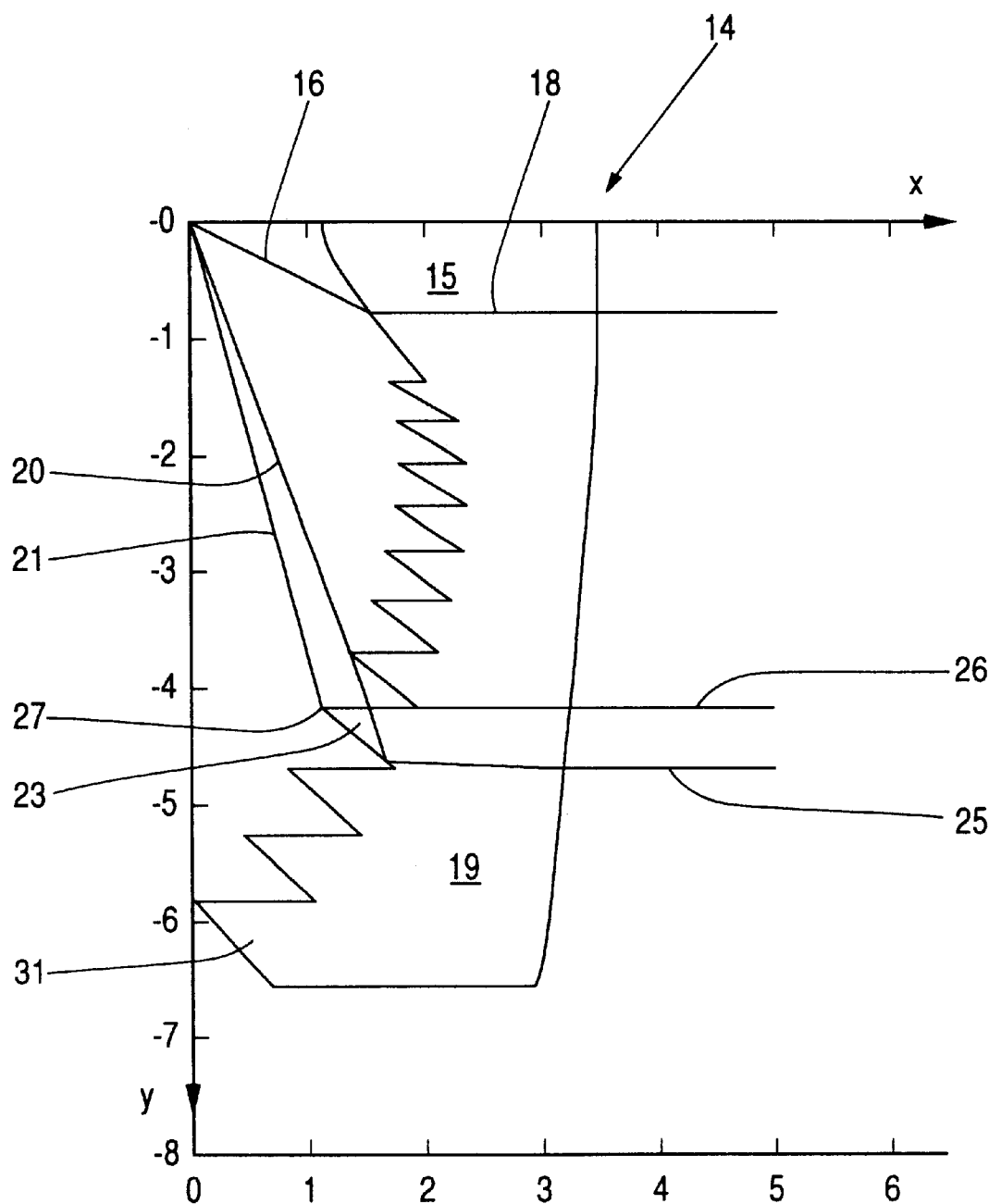
FIG. 3 shows beam courses in the lens.

A beam 16 which is incident on the aspherical dome 17 in the middle region 15 of the lens 10 is refracted into a beam 18 running parallel to the x-axis, and strikes the exit surface 13 perpendicularly, see FIG. 3. The beams 20, 21 incident in the outer region 19 of the lens 10 are firstly refracted upon entering at the top side 22 of the corresponding stage 23, then totally reflected at an underside 24 of the stage, and leave as parallel beams 25, 26 after renewed refraction at the exit surface 13, curved in this region, of the lens 10, see FIGS. 1 and 3, in which the described geometrical-optical course is represented. The courses of the beam illustrated in this case for the fourth stage 23 are to be regarded here as limiting cases (edge beams) of the beams incident inside the angular range bounded by these beams. A light beam striking an edge 27 (corner point) of a zone or stage leads in practice to stray light.

Figure 4:
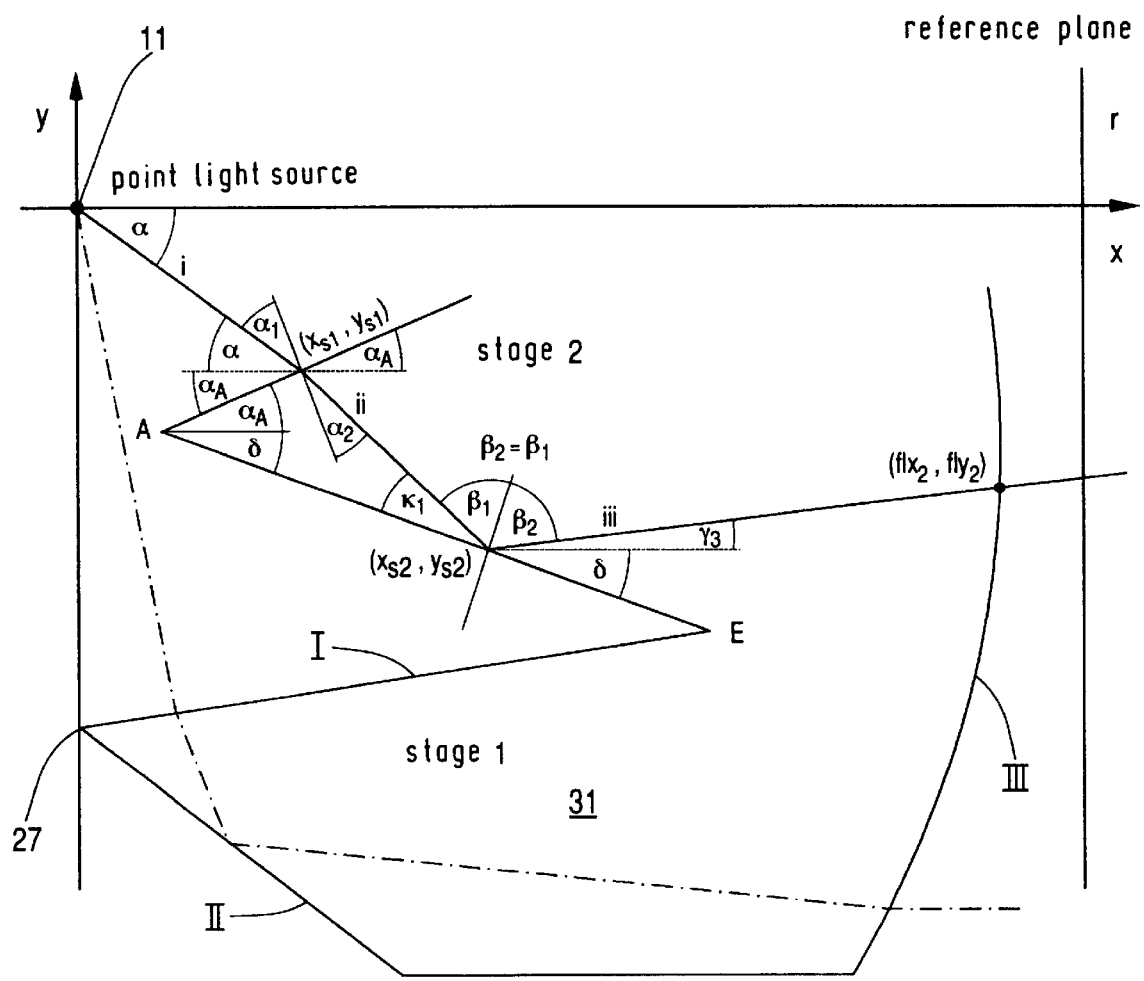
FIG. 4 shows a stage of the lens in cross section with characterizing variables in a representation which is not to scale.

The parameters characterizing the shape of the lens 10 and the course of the beam are explained below. The variables relate in this case to the cross section of the rotationally symmetrical zone lens 10 along a diameter. Some of the angular sizes and coordinates which are used in the design of the stages in the outer region 19 of the lens 10 are represented in FIG. 4, which is not to scale.

B. I. Middle Part of the Lens:

(flx$_M$, fly$_M$): coordinates of a point on an aspherical inner surface 28 of the middle part 15 $\alpha_M$: angle between the beam (for example beam 16) emanating from (0,0) and incident at (flx$_M$, fly$_M$) and the x-axis.

In this region, the exit surface 13 of the lens 10 runs perpendicular to the x-axis. The x-coordinate of this part of the exit surface is determined by the section, belonging to the 11$^{th}$ stage 29 (giving a total of 11 stages), of the exit surface 13.

B. II. Staged Region of the Lens:

The top side 22 of the respective stage is denoted by I, the underside 24, at which the total reflection takes place, by II, these boundary surfaces running in a plane fashion, while the associated section of the curved exit surface 13 is denoted by III and can be calculated from the eikonal condition, see FIG. 4. A data vector with the entries (flx$_i$, fly$_i$) describes the boundary surface III of the ith stage. ($x_{A_i}$, $y_{A_i}$) characterize the coordinates of the corner points of the ith stage in cross section, while ($x_{E_i}$, $y_{E_i}$) specify the corner points in the cross section upon transition from the previous stage to stage i. The top side 22 of the ith stage encloses an angle $\alpha_{A_i}$ with a parallel to the x-direction, and the underside 24 encloses an angle $\delta_i$ with a parallel to the x-axis. Edge beams $a_i$, $b_i$, which are detected just before the ith stage, strike the boundary surface I of the ith stage at the angle $\alpha_{a_i}$ or $\alpha_{b_i}$, respectively.

The following variables are used to describe the course of the beam (the index i characterizes the ith stage in this case), see FIG. 4, in particular:

$\alpha_{1_i}$: angle of incidence relative to the boundary surface I$_i$ $\alpha_{2_i}$: angle of emission after refraction at boundary surface I$_i$ $\beta_{1_i}$: angle of incidence relative to the boundary surface II$_i$ $\beta_{2_i}$: angle of emission after total reflection at boundary surface II$_i$ $\gamma_{3_i}$: angle of the light beam after total reflection at boundary surface II$_i$ (measured relative to the x-axis).

($x_{S_{1i}}$, $y_{S_{1i}}$) specify the coordinates of the points of intersection of the beam sections with boundary surface I$_i$, and ($x_{S_{2i}}$, $y_{S_{2i}}$) correspondingly specify the coordinates of the points of intersection of the beam sections with boundary surface II$_i$. The indices characterizing the stage with reference to the angular sizes and coordinates have been omitted in FIG. 4 for the sake of clarity. In return, the data i, ii, iii in FIG. 4 denote the three different sections of the course of the beam from the light source up to the boundary surface III (exist surface 13).

The point light source is located at ($x_p$, $y_p$)=(0,0). The first step is to calculate using the refractive indices $n_L$=1 for air and $n_{PM}$=1.493 for PMMA (acrylic) at the wavelength $\lambda$=632 nanometers. However, the refractive index is variable in the calculation.

C. Design of the Lens

Starting from input parameters described in further detail below, the shape of the lens is calculated from the outside inwards.

Input Parameters

The following variables must be prescribed to calculate the lens shape:

$\alpha_{A_1}$, ($x_{A_1}$, $y_{A_1}$)

It is necessary, furthermore, to establish in which angular range the individual stages receive light, as well as the coordinates (flx$_1$, fly$_1$) of the outermost point of the section of the exit surface 13 which belongs to the first stage, or alternatively also $\delta_1$ and flx$_1$. The thickness of the lens is virtually established with this value. The number of stages can vary within certain limits (see further below under the heading C. II. Middle part).

For the lens designed here, it was established that ($\alpha_{A_i}$=0, with the result that the top sides 22 of all the stages run parallel to the x-direction. Every stage receives light from a 5° angular range at the corresponding point.

The theoretical principles for designing the staged region and the middle part 15 of the lens 10 and for simulating the course of the beam are represented below. For the sake of clarity, the angular sizes and coordinates for the stages are specified without the index characterizing the stage.

C. I. The Stage-Shaped Region of the Lens

Calculation of the Point of Intersection of the Incident Light Beam with the Top Side of a Stage Equations (1) to (31) are quoted below. These are reproduced at the end of the description on separate sheets.

A light beam which encloses an angle $\alpha$ with the x-axis strikes the top side of a stage at the angle Eq. (1).

The coordinates of the corresponding point of intersection ($x_{S1}$, $y_{S1}$) are obtained from the intersection of the zero-point straight line $y_i$, which describes the first section i of the course of the beam, with the straight line $Y_I$ of the lateral surface I. It is precisely $y_I$ which runs through the corner point ($x_A$, $y_A$) with the gradient tan ($\alpha_A$).

Intersection of $y_i$ with $y_I$:

Eq. (2)

Eq. (3)

Eq. (4)

Eq. (5)

Calculation of the Point of Intersection of the Refracted Light Beam with the Underside of a Stage After refraction at the top side 22 of the stage upon entering the lens 10, the light beam strikes the underside 24 and is totally reflected there. The beam section ii between ($x_{S_1}$, $y_{S_1}$) und ($x_{S_2}$, $y_{S_2}$) has the gradient m=-tan (90°-$\alpha_A$-$\alpha_2$), it being possible to calculate $\alpha_2$=arcsin (($n_L$/$n_{PM}$)sin $\alpha_1$) using the law of refraction. ($x_{S_2}$, $y_{S_2}$) is the point of intersection of the straight line ii with the lateral surface II, described by $Y_{II}$:

Eq. (6)

Eq. (7)

Eq. (8)

Eq. (9)

In this case, $\delta$ is the angle between the underside of a stage and a parallel to the x-axis (compare FIG. 4). The angles $\delta$ and $\alpha_A$ together yield the internal angle of a stage. The calculation of $\delta$ is performed numerically and is carried out with the aid of the data of the preceding stage. The examination of $\delta$ is explained further below under the heading of "Successive design of the staged region".

Course of the Beam After Total Reflection at the Underside of a Stage

The beam section iii after total reflection at the underside of a stage up to the curved outer surface begins at ($x_{S_2}$, $y_{S_2}$) and has the gradient tan $\gamma_3$:

Eq. (10).

Determination of the angle $\gamma_3$ between the beam totally reflected at the boundary surface II and a parallel to the x-direction:

$\beta_2$, $\gamma_3$ and $\delta$ form a 90° angle (compare FIG. 4).

Eq. (11)

Total reflection:

$\beta_2$=$\beta_1$

The angle $\beta_1$ can be expressed via an auxiliary angle $\kappa_1$:

Eq. (12)

Sum of the angles in the triangle:

Eq. (13)

Substituting $\alpha_2$ using the law of refraction produces:

Eq. (14)

It follows from equations (11) to (14) for $\gamma_3$ that:

Eq. (15)

The end point of the straight-line section iii is denoted by (flx, fly) and is to be determined from the eikonal condition.

Course of the Beam Behind the Lens

After exiting from the prism element, the course of the beam is to be parallel to the x-axis. This beam section runs between (flx, fly) and (r, fly), r being the x-coordinate of an arbitrarily selected reference plane.

Calculation of the Eikonal and the Boundary Surface III

For a beam striking the stage at $(x_{S_1}, y_{S_1})$,

Eq. (16)

is obtained as the optical path C covered from the initial point (light source) to the encounter with the reference plane.

C is established as a constant for all light beams incident on a stage. The value of C varies from stage to stage. The value of C used is the optical path of the beam b which bounds the angular range of the beams incident on a stage in relation to the middle (see FIG. 3, middle illustrated beam 20):

Eq. (17).

The position of the reference plane r can be established arbitrarily in this case, and has no influence on the shape of the prism element to be calculated. The only limitation is that $r \geq flx$ must apply, that is to say the reference plane lies outside the lens. For the first stage, $flx_b$ and $fly_b$ can be taken from the input parameters and/or calculated. For each further stage, these variables are yielded from the data of the previous stage. The exact mode of procedure for determining $flx_b$ und $fly_b$ are described in the following section.

The coordinates (flx, fly) of the curved exit surface 13 can be determined for each stage using Eq. (16). For this purpose, Eq. (16) is solved for flx. Since the point (flx, fly) is the end point of the straight-line section $y_{iii}$, there is an analytical relationship between flx and fly in accordance with Eq. X:

Eq. (18).

Substituting Eq. (18) in Eq. (16) yields an equation as a function of flx which can be solved analytically for flx:

Eq. (19).

The data vectors $(flx_i, fly_i)$, calculated in accordance with Eq. (18) and Eq. (19) and describing the course of the section of the boundary surface III relative to stage i together yield the exit surface 13 of the lens (except for the middle part 15). It is to be noted in this case that the sections adjoin one another without an offset. The preconditions for this, as well as the determination of the angle δ and further variables which are yielded in each case from the data of the previous sections, are described in the next section.

Successive Design of the Staged Region

1$^{st}$ Stage

All the beams which form an angle α with the x-axis in the range from 85° to 90° are to strike the first stage 31. The first stage 31 is advantageously the outermost stage. However, it is also possible for the calculation to be begun with another stage. In any case, the second calculated stage is arranged adjacent to the stage first calculated. Using Eq. (1) and the law of refraction, $\alpha_{1_1}$ und $\alpha_{2_1}$ (index 1 for the first stage) can be calculated from $\alpha_A$ and α. $(x_{S_21}, y_{S_21})$ is yielded by $(x_{A_1}, y_{A_1})$ in accordance with Eq. (4) and (5). It is necessary to know $\delta_1$ in order to determine $(x_{S_21}, y_{S_21})$ in accordance with Eq. (8) and (9). For this purpose, $\delta_1$ is varied in an iteration method, and calculated for each value $(x_{S_21b}, y_{S_21b})$ and $\gamma_{3_{1b}}$ in accordance with Eq. (15) for the edge beam b of the first stage (α=85°). δ is varied until the point $(flx_1, fly_1)$ prescribed by the input lies on the beam section $y_{iii}$, given in accordance with equation X, for edge beam b:

Eq. (20).

The angle δ in the further stages is determined in a corresponding way, the aim of which is to avoid dark zones behind the lens. This is explained further below.

The course of edge beam b is prescribed by $(x_{S_11b}, y_{S_11b}), (x_{S_21b}, y_{S_21b}), (flx_{1b}, flY_{1b}) = (flx_1, fly_1)$ and an arbitrarily selected x-coordinate r for the reference plane, and Eq. (17) can be used to calculate the value of the eikonal for stage 1. With the aid of this value, the coordinates $(flx_1, fly_1)$ are determined for the first stage using Eq. (19) and Eq. (18) for each angle α in the above-named range, said coordinates being written into a data vector which therefore describes the first section of the curved outer surface. The first entry in this data vector is in this case the value $(flx_{1a}, fly_{1a})$ which is calculated for the lower incident edge beam a of the first stage. The last entry is the value $(flx_{1b}, fly_{1b})$. Edge beam a (beams 21, 26 in FIG. 3) exits from the lens as a parallel beam which is situated after passing through the lens above the edge beam b exiting in parallel (beams 20, 25 in FIG. 3).

The point on $Y_{II_1}$ whose y-coordinates corresponds to the value $fly_{1b}$, that is to say:

Eq. (21)

Eq. (22) is selected as end point $x_{E_1}, y_{E_1}$ (of the straight-line section $Y_{II_1}$ (in accordance with Eq. (7) describing the underside of stage 1).

Further Stages

The next stage is intended to receive all the beams incident in an angular range of size 5° directly adjacent to the angular range of the preceding stage. This region is bounded again by a (model) lower edge beam a (larger α) and an upper edge beam b (smaller α). Initially, $\alpha_{1_{ib}}$ und $\alpha_{2_{ib}}$ are determined. $(x_{A_i}, y_{A_i})$ must be known in order to determine $(x_{S_1ib}, y_{S_1ib})$. A value for $x_{A_i}$ is initially estimated in an iteration method of higher order than the iteration method for determining $\delta_i$. The corresponding y-coordinate $y_{A_i}$ is yielded from the condition that the corner $(x_{A_i}, yA_i)$ of this stage lies on the first beam section of the edge beam b of the annular range of the previous stage. This first beam section reaches from the point light source at (0,0) as far as the point of intersection with the top side of the previous stage, and can be determined in accordance with Eq. (2). This condition ensures that this stage i does not shadow the angular range of the beams incident on stage i–1.

Eq. (23)

is therefore yielded in accordance with Eq. (2).

Using this estimated value for $(x_{A_i}, y_{A_i})$, $\delta_i$ is determined, as described above for the first stage, in an iteration method. For this purpose, $(x_{S_2ib}, y_{S_2ib})$ and $\gamma_{3_{ib}}$ are determined for the edge beam b, and $\delta_i$ is varied until the edge beam b of this stage passes through the upper edge point $(flx_{(i-1)a}, fly_{(i-1)a})$ of the section, determined for the previous stage, of the curved outer surface, that is to say whose coordinates correspond to the first entry of the data vector for outer surface III of the previous stage. This clearly means that the edge beam a of the previous stage and edge beam b of stage i intersect at a point on the outer surface before they both are refracted to form parallel beams. In the simulation, for the refraction at boundary surface III it is in this case the limiting value of the curvature on the underside which is assumed for edge beam a of the previous stage, and the limiting value of the curvature on the top side which is assumed for edge beam b. In practice, a kink of nondefineable gradient arises at the point of intersection of the two beams. All beams striking below or above this point of intersection are, however, refracted at the appropriately curved surface to form parallel beams.

If edge beam a of the previous stage and edge beam b of stage i were to intersect not at a point on the outer surface, but inside the lens, closely neighbouring beams of edge beam b of stage i would strike a curvature of the outer surface which was calculated for beams of the previous stage, and thus not be refracted to form parallel beams when exiting from the lens.

If the point of intersection were to lie outside the lens, there would, in theory, be produced, behind the lens, a zone whose width would correspond to the vertical spacing of the points of intersection of the edge beams with boundary surface III and into which no light would enter. However, these dark zones would not be detectable in practice in conjunction with a slight extent, because of the finite extent of the light source and owing to stray light.

The abovedescribed condition also ensures that the sections of the lens outer surface calculated for the individual stages together form a continuous surface.

As already described for the first stage, after the determination of $\delta_i$ the eikonal value is calculated for the edge beam b of the ith stage in accordance with Eq. (17) from $(x_{S_1ib}, y_{S_1ib})$, $(x_{S_2ib}, y_{S_2ib})$, $(flx_{ib}, fly_{ib})$ and r.

The course of edge beam a of this stage can be calculated using this value with the aid of Eqs. (8) to (9) for the selected estimated value for $(x_{A_i}, y_{A_i})$. $x_{A_i}$ is now varied iteratively until the straight-line section iii of the edge beam a between $(x_{S_1ia}, y_{S_1ia})$ and $(flx_{ia}, fly_{ia})$ runs parallel to the top side of stage i (compare FIG. 3), that is to say Eq. (24).

$\delta_i$ is also determined for each new value for $x_{A_i}$ by means of the iteration method described above. Owing to the fact that edge beam a in the model runs along the top side of the stage, a maximum vertical extent of the section of the boundary surface III determined for stage i is reached, for which all the beams incident on stage i still reach the outer surface of the lens. After determination of the optimum value for $x_{A_i}$, for all the beams of the region defined by the edge beams a and b the eikonal condition is used to determine the coordinates $flx_i$, $fly_i$ which together produce a data vector, describing the corresponding outer surface section (exit surface 13), with $(flx_{ia}, fly_{ia})$ as first entry, and $(flx_{ib}, fly_{ib})$ as last entry.

The positions of the lower-lying edges E of the zone lens, described in FIG. 4 by the corner point $(x_E, y_E)$, are yielded from the intersection of the top sides 22 of a stage i with the undersides 24 of the next stage i+1. Using Eq. (7) and Eq. (3), the result for the coordinates $(x_{E_{i,(i-1)}}, y_{E_{i,(i-1)}})$ of the point of intersection of boundary surface II of stage i and boundary surface I of stage i−1 is:

Eq. (25)

Eq. (26).

Note on Total Reflection as Boundary Surface II

The incident beam is to be totally reflected at boundary surface II of each stage, that is to say $\beta_{1_i} \geq \beta_T$, wherein $$\beta_T = \arcsin \frac{n_L}{n_{PM}} = 42.10998°$$

is the critical angle, dependent on the material, for total reflection. By comparison with the other beams of a stage i, edge beam $a_i$ strikes boundary surface $II_i$ at the smallest angle $\beta_{1_i}$. Using Eqs. (14) and (1), the limiting condition for the angle $\alpha_{a_i}$ which the edge beam $a_i$ encloses with the x-axis before striking boundary surface $I_i$ is yielded as:

Eq.(27).

The total reflection condition referred to the edge beam $a_i$ is checked for every stage.

C. II. Middle Part

The stages of the lens become ever more acutely angled towards the middle, with the result that for reasons of production engineering it is impossible to complete the staged region towards the middle. Consequently, in the middle region of the lens the eikonal theory is used to calculate an aspherically curved inner surface 28. The outer surface (exit surface 13) runs perpendicular to the x-axis in this region. Taken as y-coordinate for this plane part of the exit surface 13 is the value $flx_{11a}$, that is to say the x-coordinate of the point of the outer surface section of the last stage at which the edge beam a for the last stage exits. Calculated as eikonal value for the middle part of the lens is the value of the eikonal for a beam which strikes the lens at $(x_{S_1 11b}, y_{S_1 11b})$ and is to be refracted there to form a beam parallel to the x-axis, with the result that it strikes the plane part of the outer surface vertically:

Eq. (28).

Coordinates $(flx_M, fly_M)$ of the middle inner part (inner surface 28) are thereby calculated. A beam which strikes the lens in the middle region encloses an angle $\alpha_M$:

Eq. (29)

with the x-axis.

The eikonal value of this beam is yielded as:

Eq. (30).

Substituting $C_M$ in accordance with Eq. (28) and $fly_M$ in accordance with Eq. (29) in Eq. (30) and solving for $flx_M$ yield:

Eq. (31)

The associated y-coordinate $fly_M$ can be calculated from

Eq. (29).

Figure 5:
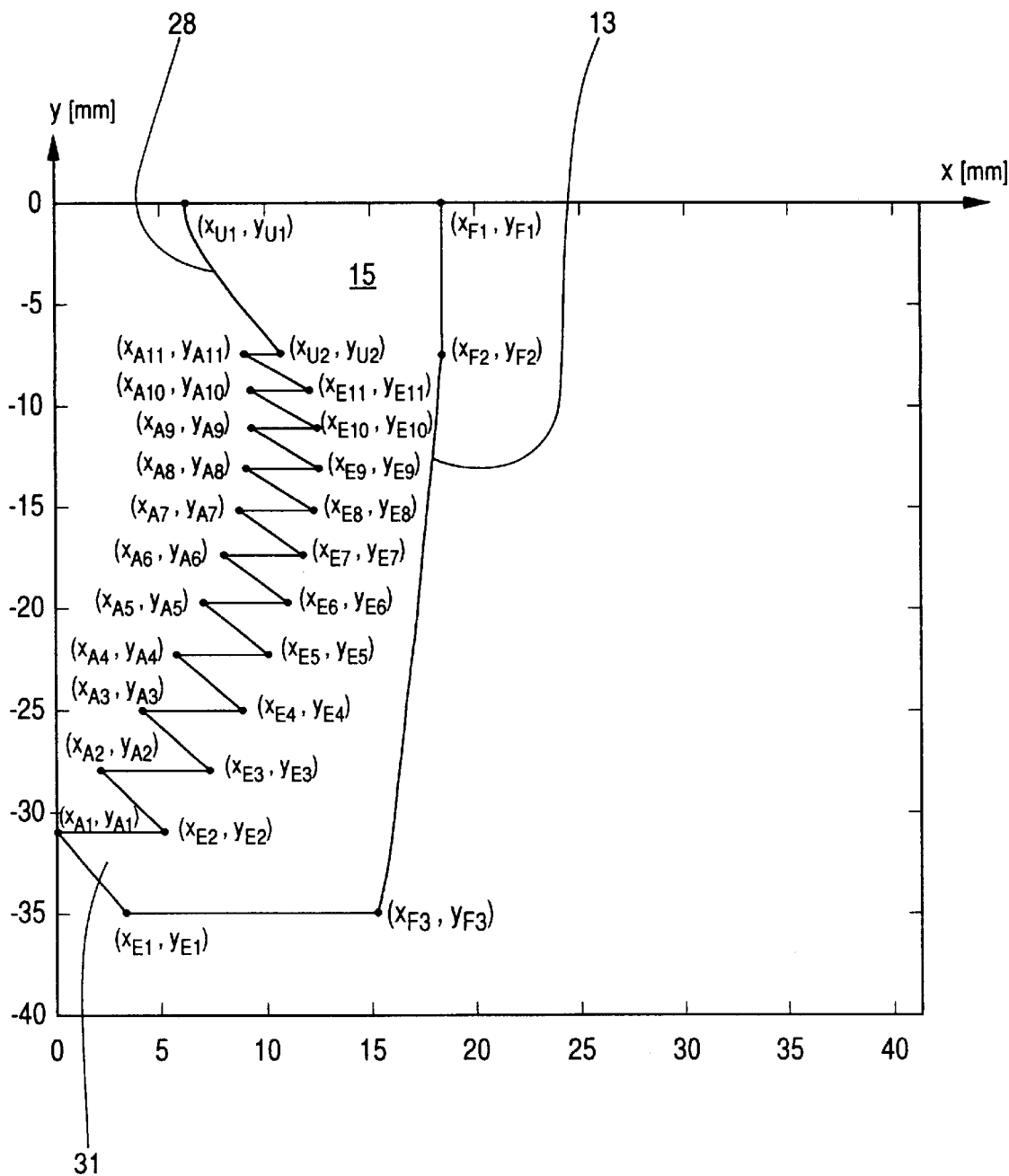
FIG. 5 shows the half cross section of the zone lens with coordinates specified.

In conjunction with the following table, FIG. 5 discloses real data of a lens to be produced using the method according to the invention. Just as in FIGS. 1 and 3, the half cross section of the lens is represented in FIG. 5. The lens is obtained by rotation about the x-axis. The total diameter of the lens is 70 mm. In the middle region 15 of the lens between $(x_{F1}, y_{F1})$ and $(x_{F2}, y_{F2})$, the outer boundary surface runs perpendicular to the x-axis. The coordinates of the curved outer surface (exit surface 13) and of the aspherically curved middle part 15 of the lens are not specified, but can be calculated as indicated above.

Coordinates (in mm) and Internal Angles of the Stages:
$x_{A1}=0.0000000$, $y_{A1}=-31.0593937$
$x_{A2}=2.4537456$, $y_{A2}=-28.0464401$
$x_{A3}=4.4210187$, $y_{A3}=-25.0728429$
$x_{A4}=5.9873530$, $y_{A4}=-22.3451056$
$x_{A5}=7.2168987$, $y_{A5}=-19.8282662$
$x_{A6}=8.1524226$, $y_{A6}=-17.4829267$
$x_{A7}=8.8206540$, $y_{A7}=-15.2778208$
$x_{A8}=9.2269386$, $y_{A8}=-13.1774340$
$x_{A9}=9.3766225$, $y_{A9}=-11.1746235$
$x_{A10}=9.2429762$, $y_{A10}=-9.2429762$
$x_{A11}=8.8741125$, $y_{A11}=-7.4462645$
$x_{E1}=3.8724230$, $y_{E1}=-35.0000000$
$x_{E2}=5.6454293$, $y_{E2}=-31.0593937$
$x_{E3}=7.7632058$, $y_{E3}=-28.0464401$
$x_{E4}=9.2369917$, $y_{E4}=-25.0728429$
$x_{E5}=10.3946378$, $y_{E5}=-22.3451056$
$x_{E6}=11.2897853$, $y_{E6}=-19.8282662$
$x_{E7}=11.9454328$, $y_{E7}=-17.4829267$
$x_{E8}=12.3751453$, $y_{E8}=-15.2778208$
$x_{E9}=12.5521130$, $y_{E9}=-19.1774340$
$x_{E10}=12.4769248$, $y_{E10}=-11.1746235$
$x_{E11}=12.0731980$, $y_{E11}=-9.2429762$
$x_{M2}=10.6343678$, $y_{M2}=-7.4462645$
$x_{F3}=16.0375527$, $y_{F3}=-35.0000000$
$\delta_1=45.5000000°$
$\delta_2=43.3500000°$ $\delta_3 = 41.6600000°$
$\delta_4 = 40.0100000°$
$\delta_5 = 38.3800000°$
$\delta_6 = 36.7800000°$
$\delta_7 = 35.2100000°$
$\delta_8 = 33.7100000°$
$\delta_9 = 32.2400000°$
$\delta_{10} = 30.8500000°$
$\delta_{11} = 29.3200000°$ Equations (1)–(31)

$$\alpha_1 = \frac{\pi}{2} - \alpha - \alpha_A \tag{1}$$

$$y_1 = -(\tan\alpha)x \tag{2}$$

$$y_I = (\tan\alpha_A)x + Y_A - (\tan(\alpha_A))x_A \tag{3}$$

$$\Rightarrow x_{S_1} = \frac{-y_A + (\tan\alpha_A)x_A}{\tan\alpha + \tan(\alpha_A)} \tag{4}$$

$$y_{S_1} = -\tan\alpha \frac{-y_A + (\tan\alpha_A)x_A}{\tan\alpha + \tan\alpha_A} \tag{5}$$

$$y_{ii} = mx + y_{S_1} - mx_{S_1} \tag{6}$$

$$y_{II} = -(\tan\delta)x + y_A + (\tan\delta)x_A \tag{7}$$

$$\Rightarrow x_{S_2} = \frac{y_A + (\tan\delta)x_A - y_{S_1} + mx_{S_1}}{m + \tan\delta} \tag{8}$$

$$y_{S_2} = -(\tan\delta)x_{S_2} + y_A + (\tan\delta)x_A \tag{9}$$

$$y_{iii} = (\tan\gamma_3)x + y_{S_2} - (\tan\gamma_3)x_{S_2} \tag{10}$$

$$\beta_2 + \gamma_3 + \delta = 90° \tag{11}$$

$$\beta_1 = 90° - \kappa_1 \tag{12}$$

$$\kappa_1 + \alpha_A + \delta + 90° + \alpha_2 = 180° \tag{13}$$

$$\beta_1 = \alpha_A + \delta + \arcsin\left(\frac{n_L}{n_{PM}}\sin\alpha_1\right) \tag{14}$$

$$\tau_3 = 90° - \alpha_A - \arcsin\left(\frac{n_L}{n_{PM}}\sin\alpha_1\right) \tag{15}$$

$$C = n_L\sqrt{x_{S_1}^2 + y_{S_1}^2} + n_{PM}\sqrt{(x_{S_2}-x_{S_1})^2 + (y_{S_2}-y_{S_1})^2} + n_{PM}\sqrt{(flx-x_{S_2})^2 + (fly-y_{S_2})^2} + n_L(r - flx) \tag{16}$$

$$C = n_L\sqrt{x_{S_{1b}}^2 + y_{S_{1b}}^2} + n_{PM}\sqrt{(x_{S_{2b}}-x_{S_{1b}})^2 + (y_{S_{2b}}-y_{S_{1b}})^2} + n_{PM}\sqrt{(flx_b-x_{S_{2b}})^2 + (fly_b-y_{S_{2b}})^2} + n_L(r - flx_b) \tag{17}$$

$$fly = (\tan\gamma_3)flx + y_{S_2} - (\tan\gamma_3)x_{S_2} \tag{18}$$

$$flx = \frac{C - n_L\sqrt{x_{S_1}^2 + y_{S_1}^2} + n_{PM}\sqrt{(x_{S_2}-x_{S_1})^2 + (y_{S_2}-y_{S_1})^2} + n_{PM}x_{S_2}\sqrt{1+\tan^2\gamma_3} - n_L r}{n_{PM}\sqrt{1+\tan^2\gamma_3} - n_L} \tag{19}$$

$$fly_1 = (\tan\gamma_{3_{1b}})flx_1 + y_{S_{2_{1b}}} - (\tan\gamma_{3_{1b}})x_{S_{2_{1b}}} \tag{20}$$

$$y_{E_1} = fly_{1b} \tag{21}$$

$$x_{E_1} = \frac{fly_{1b} - yA_1 - (\tan\delta_1)x_{A_1}}{-\tan\delta_1} \tag{22}$$

$$y_{A_1} = -(\tan\alpha_{(i-1)b})x_{A_i} \tag{23}$$

$$\tan\alpha_{A_1} = \frac{fly_{i_a} - y_{S_{2_{i_a}}}}{flx_{i_a} - x_{S_{2_{i_a}}}} \tag{24}$$

-continued $$x_{E_i,(i-1)} = \frac{y_{A_i} + (\tan\delta_i)x_{A_i} - y_{A_{i-1}} + (\tan\alpha_{A_{i-1}})x_{A_{i-1}}}{\tan\alpha_{A_{i-1}} + \tan\delta_i} \tag{25}$$

$$y_{E_i,(i-1)} = -(\tan\delta_i)x_{E_i,(i-1)} + y_{A_i} + (\tan\delta_i)x_{A_i} \tag{26}$$

$$\sin(90° - \alpha_{a_1} - \alpha_{A_i}) \geq \frac{n_{PM}}{n_L}\sin(\beta_T - \alpha_{A_i} - \delta_i) \tag{27}$$

$$C_M = n_L\sqrt{x_{S_{11b}}^2 + y_{S_{11b}}^2} + n_{PM}(flx_{11a} - x_{S_{11b}}) + n_L(r - flx_{11a}) \tag{28}$$

$$\tan\alpha_M = \frac{fly_M}{flx_M} \tag{29}$$

$$C = n_L\sqrt{flx_M^2 + fly_M^2} + n_{PM}(flx_{11a} - flx_M) + nL(r - flx_{11a}) \tag{30}$$

$$flx_M = \frac{C_M - flx_{11a}(n_{PM} - n_L) - n_L \cdot r}{n_L\sqrt{1 + (\tan\alpha_M)^2} - n_{PM}} \tag{31}$$

Applicant:
aqua signal Aktiengesellschaft
Spezialleuchtenfabrik
Von-Thunen-Str. 12
28307 Bremen

| List of reference symbols | |
|---|---|
| 10 Fresnel lens | C Optical path |
| 11 Point light source | E Edge |
| 12 Entrance surface | I Top side |
| 13 Exit surface | II Underside |
| 14 Half cross section | III Outer side |
| 15 Middle part | r Reference plane |
| 16 Beam | i Stage |
| 17 Dome | α Angle of emission relative to the x-axis |
| 18 Beam | |
| 19 Outer region | αA Angle of the top side I relative to the x-axis |
| 20 Beam | |
| 21 Beam | α1 Angle of incidence on the boundary surface I |
| 22 Top side | |
| 23 Stage | α2 Exit angle at the boundary surface I |
| 24 Underside | |
| 25 Beam | β1 Angle of incidence on the boundary surface II |
| 26 Beam | |
| 27 Edge | β2 Exit angle at the boundary surface II |
| 28 Inner surface | |
| 29 11th stage | γ3 Angle of the light beam after total reflection at the boundary surface II relative to the x-axis |
| 30 | |
| 31 1st stage | |
| A Edge | |
| δ Angle of the underside 24 with the x-axis | |
| κ1 Auxiliary angle | |
| (flx$_i$, fly$_i$) Coordinates along the boundary surface III of the ith stage | |
| (x$_{Ai}$, y$_{Ai}$) Coordinate of the corner point of the ith stage in cross section | |
| (x$_{Ei}$, y$_{Ei}$) Coordinates of the corner point in cross section for the transition from stage i-1 to stage i | |

What is claimed is:
1. Method for producing a Fresnel lens on a catadioptric basis having a staged entrance surface (12), reflecting surfaces and an at least partially curved exit surface (13), the shape of the Fresnel lens (10) being determined as follows:

a) a radial cross section (14) is determined in a stagewise fashion, specifically firstly for an arbitrary first stage (stage 1), then for the stages adjacent thereto, and thereafter successively for all further adjacent stages until the cross sections of the individual stages have all been determined, b) starting from
   predetermined angles $\alpha_{A_i}$ of top sides of the stages relative to a central axis (x-axis) of the lens,
   the coordinates $(x_{A_1}, y_{A_1})$ of a corner point $A_1$ of the first stage referred to the location (0,0) of a punctiform light source (11),
   the angular ranges in which the individual stages (i) receive light,
   a coordinate $flx_1$ of an outermost point $(flx_1, fly_1)$ of the section of the exit surface (13) which belongs to the first stage (i=1),
   and an angle $\delta_1$ of reflecting surface of the first stage, c) firstly the coordinates $fly_1$ of the outermost point $(flx_1, fly_1)$, the eikonal and the further coordinates $(flx_1, fly_1)$ of the exit surface (13) are determined for the first stage, specifically for a number of light beams corresponding to the desired accuracy, d) on the basis of the data determined for the first stage, the data of a second stage, then of a third stage, etc. are determined for all the stages as a whole, e) finally, for a middle region (middle part 15) of the lens (10) having no reflecting surfaces the data of a curved entrance surface (inner surface 28) are determined taking account of the eikonal condition and with the exit surface (13) prescribed, and f) the complete outer shape of the lens (10) is determined by rotation of the radial cross section (14) about a central axis (x-axis).

2. Method according to claim 1, characterized in that the radial cross section is determined in a stagewise fashion, specifically starting with the outermost stage 1 and stage by stage inwardly progressively.

3. Method according to claim 1, characterized in that the following conditions are prescribed:
   the angles $\alpha_{A_i}$ of the top sides (22) of all the stages (i) relative to the central axis (x-axis) are equal to 0,
   the top sides (22) and reflecting surfaces (undersides 24) are plane.

4. Method according to claim 1, characterized in that the angle $\delta_1$ of the reflecting surface (underside 24) relative to the central axis (x-axis) is determined iteratively, specifically by variation until a beam section $y_{iii}$ for an inner edge beam b lies on the point with the coordinates $(flx_1, fly_1)$.

5. Method according to claim 4, characterized in that upon transition from a first stage to the adjacent (inner) second stage an estimated value of the x-coordinate of the corner point $A_2$ of the second stage, specifically $x_{A_2}$, is initially assumed, in that the y-coordinate of the corner point $A_2$, and thus the first point $(x_{A_2}, y_{A_2})$, are calculated on the basis of the predetermined angular ranges in which the stages receive light, and on the basis of the predetermined angle $\alpha_{A_i}$ of the top sides of the stages i,
   in that the angle $\delta_2$ of the reflecting surface of the second stage is determined iteratively until a beam section $y_{iii}$ for an inner edge beam b of the second stage lies on the point with the coordinates $(flx_2, fly_2)$, it being intended that this point $(flx_2, fly_2)$ should correspond to the adjacent coordinates $(flx_1, fly_1)$ of the first stage,
   in that the angle between the inner edge beam b of the second stage and the outer edge beam a of the first stage is checked before exit from the lens and minimized by variation of $x_{A_2}$ and the subsequent iteration of $\delta_2$,
   and in that the further points $(flx_2, fly_2)$ of the second stage are then determined taking account of the eikonal condition.

6. Method according to claim 1, characterized in that the angle $\delta_1$ of the reflecting surface of the first stage is selected—given a right angle between the outer edge beam a and entrance surface (12)—to be greater than 45°, but as close as possible to 45°.

7. Method according to claim 1, characterized in that an angle between the reflecting surface and entrance surface in each stage is selected such that a beam section iii of the outer edge beam a forms with the entrance surface in this region an angle which is as small as possible.

8. Method according to claim 1, characterized in that the middle region (middle part 15) of the lens (10) has a plane exit surface (13).

9. Method according to claim 1, characterized in that the middle region (middle part 15) of the lens (10) has an exit surface (13) which is convexly curved in continuation of the individual stages.

10. Method for producing a Fresnel lens on a catadioptric basis having a staged entrance surface (12), reflecting surfaces and an at least partially curved exit surface (13), the shape of the Fresnel lens (10) being determined as follows:

a) a radial cross section (14) is determined in a stagewise fashion, specifically firstly for an arbitrary first stage (stage 1), then for the stages adjacent thereto, and thereafter successively for all further adjacent stages until the cross sections of the individual stages have all been determined, b) starting from
   predetermined angles $\alpha_{A_i}$ of top sides of the stages relative to a central axis (x-axis) of the lens,
   the coordinates $(x_{A_1}, y_{A_1})$ of a corner point $A_1$ of the first stage referred to the location (0,0) of a punctiform light source (11),
   the angular ranges in which the individual stages (i) receive light,
   and coordinates of an outermost point $(flx_1, fly_1)$ of the section of the exit surface (13) which belongs to the first stage (i=1), c) firstly the angle $\delta_1$ of a reflecting surface of the first stage, the eikonal and the further coordinates $(flx_1, fly_1)$ of the exit surface (13) are determined for the first stage, specifically for a number of light beams corresponding to the desired accuracy, d) on the basis of the data determined for the first stage, the data of a second stage, then of a third stage, etc. are determined for all the stages as a whole, e) finally, for a middle region (middle part 15) of the lens (10) having no reflecting surfaces the data of a curved entrance surface (inner surface 28) are determined taking account of the eikonal condition and with the exit surface (13) prescribed, and f) the complete outer shape of the lens (10) is determined by rotation of the radial cross section (14) about a central axis (x-axis).

11. Fresnel lens having a staged entrance surface (12), reflecting surfaces and an exit surface (13), the following conditions being fulfilled:

a) the entrance surface (12) is subdivided into outer concentric stages and a middle part (15), b) the middle part (15) is aspherically curved on an entrance side and plane on an exit side, the curvature on the entrance side being such that—given mutually parallel beams on the exit side and a punctiform light source on the entrance side—the eikonal condition is fulfilled inside each stage,
c) each stage has a top side, underside and outer side, the top side being the entrance side, the underside reflecting totally and the outer side being the exit surface,
d) the outer sides of the stages merge into one another with the formation of the common exit surface (13) of the lens (10), the plane exit side of the middle part (15) being part of the common exit surface (13),
e) top sides and undersides are plane, and
f) the outer sides of the stages are curved, the curves being such that the eikonal condition is fulfilled inside every stage.

12. Lens according to claim 10, characterized in that the top sides of the stages run parallel to a central axis (x-axis) of the lens (10).

13. Fresnel lens produced using a method according to claim 1.

* * * * *

UNITED STATES PATENT AND TRADEMARK OFFICE
CERTIFICATE OF CORRECTION

PATENT NO. : 6,252,724 B1
DATED : June 26, 2001
INVENTOR(S) : Ulla Scheer

It is certified that error appears in the above-identified patent and that said Letters Patent is hereby corrected as shown below:

<u>Title page,</u>
Item [73] Assignee:, delete "Spezialleuchfabrik" and replace with
-- Spezialleuchtenfabrik --.

Signed and Sealed this

Second Day of April, 2002

*Attest:*

*Attesting Officer*

JAMES E. ROGAN
*Director of the United States Patent and Trademark Office*